United States Patent [19]

Schmidt, deceased et al.

[11] 4,043,978

[45] Aug. 23, 1977

[54] POLYIMIDES

[75] Inventors: Gerhard Martin Julius Schmidt, deceased, late of Rehovot, Israel, by Ester Schmidt, administratrix and sole heir; Michael Dror; Gad Friedman, both of Rehovot, Israel; Harold H. Levine, La Jolla, Calif.

[73] Assignee: Yeda Research & Development Co., Ltd., Rehovot, Israel

[21] Appl. No.: 453,049

[22] Filed: Mar. 20, 1974

[30] Foreign Application Priority Data

Mar. 25, 1973 Israel ........................................ 41869

[51] Int. Cl.$^2$ ...................... C08G 73/10; C08G 73/12
[52] U.S. Cl. ........................... 260/47 CP; 260/47 UA; 260/78 TF; 260/78 UA
[58] Field of Search ................ 260/78 TF, 47 CP, 65, 260/47 UA; 78 UA

[56] References Cited

U.S. PATENT DOCUMENTS

| 3,037,966 | 6/1962 | Chow et al. | 260/78 |
| 3,179,614 | 4/1965 | Edwards | 260/30.2 |

FOREIGN PATENT DOCUMENTS

| 909,242 | 9/1972 | Canada | 260/78 TF |

*Primary Examiner*—Lester L. Lee
*Attorney, Agent, or Firm*—Hubbell, Cohen, Stiefel & Gross

[57] ABSTRACT

A process for the production of novel polyimide polymers and copolymers which comprises reacting a cyclooctadiene-1,2,5,6-tetracarboxylic acid bisanhydride, or a derivative of same, with an amine, or mixture of amines, of the formula $H_2N-A-NH_2$ wherein A designates an aliphatic, an aromatic, an araliphatic or a heterocyclic group, which may be substituted. Novel polyimides obtained by such process.

10 Claims, No Drawings

POLYIMIDES

BACKGROUND OF THE INVENTION

Most of the polyimides described in the literature are structures containing completely aromatic moieties in the chain. An example of these is "H-film" of Du Pont, which is prepared from pyromellitic bisanhydride and 4,4'-diamino-diphenyl ether. Modifications of such polymers, as for example by the introduction of aliphatic groups and/or alicyclic rings, are known. Such modifications are intended to improve specific properties of the product and to facilitate the processing of these. While some of these known polymers undergo swelling in certain organic solvents, none of these are soluble in organic solvents. All the polyimides described in the literature need a treatment at 300° C to become fully cyclized and thus attain their optimal properties.

SUMMARY OF THE PRESENT INVENTION

The present invention relates to certain novel polymers and copolymers and to a process for producing these. More particularly, the invention relates to certain novel polymers and copolymers which are characterized by a linear structure of the molecules, and which possess certain interesting physical properties, such as resistance to oxidation and to thermal degradation and, unlike previously known analogous polymers, are soluble in certain solvents in spite of a comparatively high molecular weight.

The novel polymers and copolymers are polyimides, and their preparation is set out hereinafter.

The compound 1,5-cyclo-octadiene-1,2,5,6-tetracarboxylic acid bisanhydride (CCOD) is a valuable starting material for the production of polyimide polymers and copolymers. The novel polymers are obtained by reacting CCOD or a suitable similar compound and a suitable diamine of the general formula $H_2N-A-NH_2$, wherein A designates an aliphatic, aromatic, araliphatic or heterocyclic group, which may be substituted. Practically any aliphatic diamine, any aromatic, any araliphatic, or any heterocyclic diamine can be used. There may be used mixtures of such diamines, resulting in a modification of properties of the resulting polyimides. This reaction gives a fully cyclized polyimide at temperatures between 80°-110° C. Novel copolymers can be obtained by effecting such a polymerization in the presence of a further monomer capable of forming in the linear structure which is characteristic of these polymers.

Compared with the conventional ring systems used to make polyimides, the CCOD ring system has a substantially increased degree of freedom of motion and this results in an improved solubility of the product. The novel polymers seem to have an enhanced energy absorption via stress relaxation, and their processability seems to be better than that of conventional polyimides. These properties are of value in adhesive formulations. The polymers, according to the present invention, are of relatively high molecular weight and, in spite of this, they are soluble in m-cresol.

The following examples illustrate the invention and are to be construed in a non-limiting sense.

DESCRIPTION OF THE PREFERRED EMBODIMENT:

EXAMPLE 1

A thoroughly dried 100 ml round-bottom glass flask, fitted with a Teflon-protected magnetic stirrer, a gas inlet and a gas outlet, was flushed with argon for 30 minutes. 50 ml of twice distilled m-cresol were introduced, the system was evacuated to 0.3 torr and, when bubbles ceased to appear, argon was reintroduced. 2.00 g (10 mM) of 4,4'-diamino-diphenyl-methane(-DADPM), twice crystallized from water containing 1% hydrazine) and 2.35 g (9.5 mM) of 1,5-cyclo-octadiene-1,2,5,6-tetracarboxylic acid bisanhydride ((CCOD), recrystallized from acetic acid: acetic anhydride 9:1) and 1.2 ml quinoline were introduced, stirring was started, the system was evacuated and after 2 minutes argon was reintroduced.

The mixture was stirred for 7 hours at 50° C under a slow stream of argon. The rest of the CCOD, 124 mg (0.05 mM), was added and the reaction mixture was heated for 28 hours at 110° C with stirring.

After cooling, the solution was slowly poured into 300 ml distilled methanol, while this was stirred in a blender. A yellowish-white precipitate was obtained which was filtered off, washed with methanol and dried at 120° C to constant weight. Yield: 3.52 g (85%). The properties are given in the Tables.

EXAMPLE 2

An apparatus was used as in Example 1, which was fitted with an additional mechanical stirrer.

25 ml m-cresol were introduced and deaerated, followed by addition of 1.00 g (5 mM) 4,4'-diamino-diphenyl ether, ((DADPE) twice sublimed over silica gel), and 1.178 g (4.75 mM) CCOD. The mixture was again deaerated, stirred with a magnetic stirrer and heated to 80° C for an hour and a half. The rest of the CCOD (63 mg) and 0.6 ml quinoline were added, the temperature was increased to 110° C and stirring was continued with a magnetic stirrer. After 10 hours the magnetic stirrer was replaced by a mechanical one due to the increased viscosity. After a further 10 hours of stirring, the mixture was allowed to cool slightly and it was poured slowly into 230 ml methanol in a blender. A yellowish precipitate was obtained which was filtered, washed with 300 ml methanol and dried to constant weight at 100° C/0.1 torr. Yield: 1.95 g (95%). The properties are given in the Tables.

In a similar manner and under the same conditions of reaction and of working up a reaction was carried out with 9.3 g (37.5 mM) CCOD added to a mixture of 3.75 g (18.75 mM) of DADPE and 3.75 g (18.75 mM) of DADPM and 4.2 ml quinoline. The product had properties similar to those of the polyimide prepared in the first part of this example.

In a similar manner other copolymers were prepared and these too had similar properties and are suitable for the intended uses.

EXAMPLE 3

175 ml m-cresol were introduced into a 500 ml round-bottom flask, fitted with a mechanical stirrer, a gas inlet and an air condenser. The system was deaerated under vacuum and argon was introduced. 7.5 g (37.5 mM) DADPE was introduced and the suspension was deaerated under vacuum. 8.8g (35.5 mM) of CCOD and 4.2 ml quinoline were added and the temperature was increased to 80° C. A slow flow of argon was maintained and the stirring was continued. After 1 hour, the temperature was increased to 100° C and this was main- 55° C for 4 hours, to 80° C for 12 hours, cooled and poured into acetone, forming a white-yellowish precipitate which had an I.R. trace identical with that of Example 2.

TABLE 1

| Polyimide Prepared From: | Typical Absorption in the I.R. | Tg (° C) | Decomposition Temperature TGA in Air (° C) | TGA in Argon (° C) | Inherent Viscosity 10.5% in m-cresol) |
|---|---|---|---|---|---|
| CCOD + DADPM (Ex.1) | 1770, 1710 cm$^{-1}$ | 320 | 365 | 440 | 1.32 |
| CCOD + DADPE (Ex.2) | " | 293 | 368 | 450 | 1.48 |
| CCOD + DADPE (Ex.3) | " | — | — | — | 1.87 |
| CCOD + HMD (Ex.4) | " | 140 | 365 | 442 | 2.43 |
| UCOD + DADPE (Ex.5) | " | — | — | — | — |

CCOD 5,5-cyclo-octadiene-1,2,5,6-tetracarboxylic acid bisanhydride
UCOD 3,7-cyclo-octadiene-1,2,5,6-tetracarboxylic acid bisanhydride
DADPM 4,4'-diamino diphenyl methane
DADPE 4,4'-diamino diphenyl ether
HMD hexamethylene diamine-1,6

TABLE 2

| Polyimide Prepared From: | Modulus of Elasticity (psi) | Tensile Strength (psi) | Elongation at Yield (%) | Elongation at Break (%) |
|---|---|---|---|---|
| CCOD + DADPM (Ex.1) | 291000 | 8560 | 6.5 | — |
| CCOD + DADPE (Ex.3) | 270000 | 6800 | 5.6 | 60 | tained for 10 hours. The mixture was cooled to 60° C and 0.5 g (2 mM) CCOD was added. A high vacuum (about 3 torr) was slowly applied, causing strong bubbling. After this, the heating was continued for a further 47 hours at 110° C. The resulting viscous solution was cooled and poured into methanol in a blender, as in the preceding examples. A yellowish precipitate was obtained, which was washed with 250 ml methanol in the blender, followed by filtration. This was repeated six times, until no smell of m-cresol could be detected. The product was dried to constant weight at 90° C/0.1 torr. Yield: 13.8 g (90%). The properties are given in the Tables.

EXAMPLE 4

A thoroughly dried 100 ml round-bottom flask was fitted with a mechanical stirrer, a gas inlet and an air condenser.

40 ml deaerated m-cresol and 1.0 g (8.55 mM) hexamethylene diamine (HMD), freshly distilled under vacuum, were introduced and the system was deaerated. 1.9 g (7.7mM) CCOD was added and the mixture was again deaerated. Argon was introduced and a slow flow of argon and stirring were maintained. The reaction mixture was maintained 3 hours at 45° C; after this, the rest of the CCOD, namely 210 mg and 1.0 ml quinoline, were added. The reaction mixture was heated to 65° C and kept at this temperature for 15 hours. The temperature was increased to 110° C and heating was continued for 65 hours. The precipitation and working up were effected as in Example 2. Yield: 2.55 g (91%). Properties are given in the Tables.

EXAMPLE 5

The apparatus used was that of Example 1. 5 ml of m-cresol were introduced and deaerated under high vacuum. 202 mg (1 mM) of 4,4'-diamino-diphenyl ether and 0.12 ml quinoline were added and this was followed by a further deaeration. 248 mg (1 mM) of 3,7-cyclo-octadiene-1,2,5,6-tetracarboxylic acid bisanhydride (UCOD) were added, the temperature was increased to

We claim:
1. A process for the production of polyimide polymers, which comprises reacting cyclooctadiene-1,2,5,6-tetracarboxylic acid bisanhydride with 4,4'-diamino-diphenyl-methane, 4,4'-diamino-diphenyl ether, a mixture of 4,4'-diamino-diphenyl-methane and 4,4'-diaminodiphenyl ether or hexamethylene diamine in the presence of m-cresol as a solvent.

2. The process of claim 1, wherein the reaction is carried out at temperatures within the range of from 80° to 110° C.

3. The process of claim 1, which comprises reacting cyclooctadiene-1,2,5,6-tetracarboxylic acid bisanhydride with 4,4'-diamino-diphenyl-methane.

4. The process of claim 1, which comprises reacting cyclooctadiene-1,2,5,6-tetracarboxylic acid bisanhydride with 4,4'-diamino-diphenyl ether.

5. A polyimide prepared by the reaction, in the presence of m-cresol as a solvent, of a cyclooctadiene-1,2,5,6-tetracarboxylic acid bisanhydride and an amine of the general formula $H_2N-A-NH_2$, wherein A is an aliphatic, aromatic or araliphatic group.

6. The process of claim 1, which comprises reacting cyclooctadiene-1,2,5,6-tetracarboxylic acid bisanhydride with hexamethylene diamine.

7. The polyimide of claim 6, comprising the reaction product of cyclooctadiene-1,2,5,6-tetracarboxylic acid bisanhydride with 4,4'-diamino-diphenyl-methane, 4,4'-diamino-diphenyl ether, a mixture of 4,4'-diamino-diphenyl-methane and 4,4'diaminodiphenyl ether, or hexamethylene diamine.

8. The polyimide of claim 6, comprising the reaction product of cyclooctadiene-1,2,5,6-tetracarboxylic acid bisanhydride with 4,4'-diamino-diphenyl-methane.

9. The polyimide of claim 6, comprising the reaction product of cyclooctadiene-1,2,5,6-tetracarboxylic acid bisanhydride with 4,4'-diamino-diphenyl ether.

10. The polyimide of claim 6, comprising the reaction product of cyclooctadiene-1,2,5,6-tetracarboxylic acid bisanhydride with hexamethylene diamine.

* * * * *

UNITED STATES PATENT OFFICE
CERTIFICATE OF CORRECTION

Patent No. 4,043,978    Dated August 23, 1977

Inventor(s) Gerhard H. J. Schmidt et al.

It is certified that error appears in the above-identified patent and that said Letters Patent are hereby corrected as shown below:

Columns 3-4, Table 1, last column: "0.5" in m-cresol" should read -- (0.5% in m-cresol) --.

Column 4, claim 7, line 1: "claim 6," should read -- claim 5, --; claim 8, line 1: "claim 6," should read -- claim 5, --; claim 9, line 1: "claim 6," should read -- claim 5 --; claim 10, line 1: "claim 6," should read -- claim 5, --.

Signed and Sealed this

Seventeenth Day of January 1978

[SEAL]

Attest:

RUTH C. MASON
*Attesting Officer*

LUTRELLE F. PARKER
*Acting Commissioner of Patents and Trademarks*